United States Patent [19]

Mashiko et al.

[11] Patent Number: 4,919,531
[45] Date of Patent: Apr. 24, 1990

[54] IMAGE REPRODUCING DEVICE

[75] Inventors: Harumitsu Mashiko, Tokyo; Takashi Seto, Ayase; Shigeru Suzuki, Yokohama, all of Japan

[73] Assignee: Ricoh Company, Ltd., Tokyo, Japan

[21] Appl. No.: 277,948

[22] Filed: Nov. 30, 1988

[30] Foreign Application Priority Data

Dec. 1, 1987 [JP] Japan ................................ 62-301603

[51] Int. Cl.⁵ ............................................. G03B 27/32
[52] U.S. Cl. ........................................ 355/27; 355/28
[58] Field of Search ................ 355/27, 28, 29, 40, 355/41, 19, 77, 79, 84, 88, 132; 354/304, 298, 21

[56] References Cited

U.S. PATENT DOCUMENTS

| | | | |
|---|---|---|---|
| Re. 28,828 | 5/1976 | Komori et al. | 355/234 |
| 1,561,945 | 11/1925 | Penin | 352/78 R |
| 2,106,374 | 1/1938 | Goldhammer et al. | 352/78 R |
| 4,147,427 | 4/1979 | Stewart | 355/72 |
| 4,332,456 | 6/1982 | Kaufmann | 355/27 |
| 4,519,689 | 5/1985 | Kinsman et al. | 354/304 |
| 4,529,302 | 7/1985 | Tisserand | 355/79 |
| 4,565,440 | 1/1986 | Bloechl et al. | 355/27 |
| 4,693,963 | 9/1987 | McCole | 354/304 |
| 4,745,442 | 5/1988 | Oshikoshi et al. | 355/28 |
| 4,782,365 | 11/1988 | Takagi | 355/41 |

Primary Examiner—L. T. Hix
Assistant Examiner—Khanh Dang
Attorney, Agent, or Firm—Oblon, Spivak, McClelland, Maier & Neustadt

[57] ABSTRACT

An image reproducing device in which a photosensitive film cartridge, a transfer sheet cassette and a developer pod receptacle are mounted separately, and a peel-apart type film is used. The kinds of photosensitive film, transfer film and pod are detected to prevent an incorrect combination and to inhibit the operation of the device. In other embodiments, some of the elements are mounted together. The elements are marked with a code which is sensed.

25 Claims, 14 Drawing Sheets

Fig. 18
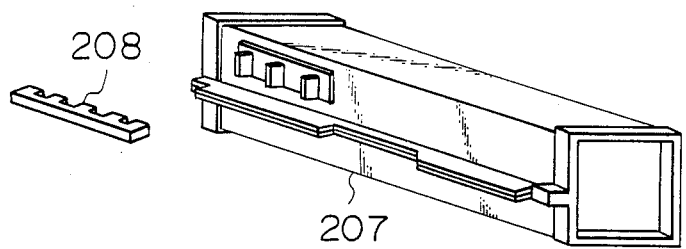
Fig. 19
Fig. 20
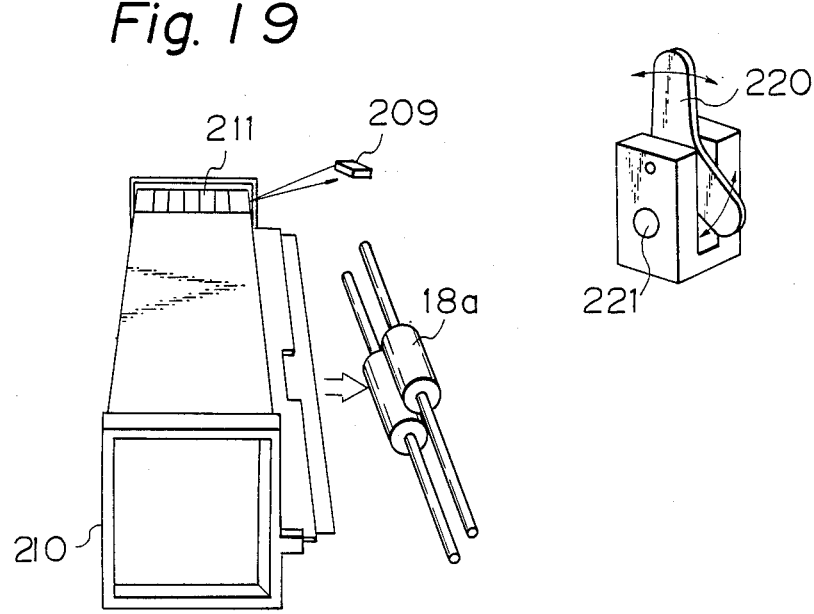

IMAGE REPRODUCING DEVICE

BACKGROUND OF THE INVENTION

1. Field of the Invention

The present invention relates generally to image reproducing devices and more particularly to image reproducing devices using a peel-apart type film.

2. Discussion of Background

An instant photographic device using a peel-apart type instant photographic film has a mechanism in which part of a photosensitive film is drawn out from a roll of photosensitive film, cut away and carried to an exposure position where the resulting sheet of film is exposed and superposed on a transfer sheet fed with a pod containing a developer fed therebetween, a seal for the pod is broken by pressure from the developing roller so that the developer is spread uniformly between the photosensitive sheet and the transfer sheet, so that development and transfer are then effected.

In a device of this type, a transparency for an overhead projector, color printing paper, black-and-white printing paper, etc., are used as printing paper the photosensitive film, the developing pod, and the transfer sheet selected depend on the kind of printing paper used. Generally, in a device of this type, a photosensitive film cartridge and transfer sheets each can be selected, so that, for example, a transfer sheet and a developer pod used for transparencies may wrongly be inserted when a photosensitive film cartridge for color printing paper is already inserted.

As the related arts to this invention, there are Japanese Patent Application Laying-Open Nos. 61-138933 through 61-138935, and U.S. Application No. 196,604 filed on May 20, 1988 by the applicants of this invention.

SUMMARY OF THE INVENTION

It is an object of the present invention to prevent the operation of an image reproducing device when a photosensitive film, transfer sheet and developer pod are not the same kind.

This object can be achieved by a first image reproducing device in which a photosensitive film cartridge, a transfer sheet cassette and a developer pod receptable are each mounted separately, and a peel-apart type film is used, comprising:

a first sensor for sensing a first code indicative of the type of the photosensitive film and applied to the photosensitive film or the photosensitive film cartridge;

a second sensor for sensing a second code indicative of the kind of the transfer sheet and applied to the transfer sheet or the transfer sheet cassette;

a third sensor for sensing a third code indicative of the kind of the pod and applied to the pod or the pod receptacle; and means for inhibiting the operation of the device when at least two of the sensed first, second and third codes are different from each other.

According to the first image reproducing device of the present invention, the kinds of photosensitive film, transfer sheet and pod are detected to prevent an incorrect combination of them and to inhibit the operation of the device.

It is another object of the present invention to prevent the operation of an image reproducing device when a photosensitive film and a transfer sheet are not the same kind.

This another object can be achieved by a second image reproducing device in which a photosensitive film cartridge and a transfer sheet cassette are each mounted separately, and a peel-apart type film is used, comprising:

a first sensor for sensing a first code indicative of the type of the photosensitive film and applied to the photosensitive film or the photosensitive film cartridge;

a second sensor for sensing a second code indicative for the kind of the transfer sheet and applied to the transfer sheet or the transfer sheet cassette; and means for inhibiting the operation of the device when the sensed first and second codes are different from each other.

This object can also be achieved by a third image reproducing device comprising an integral type container in which a photosensitive film and a developer pod of the same kind are contained, a transfer sheet cassette is mounted separately from the container, and a peel-apart type film is used, comprising:

a first sensor for sensing a first code indicative of the type of the photosensitive film and pod applied to the integral container;

a second sensor for sensing a second code indicative of the kind of the transfer sheet and applied to the transfer sheet or the transfer sheet cassette; and means for inhibiting the operation of the device when the sensed first and second codes are different from each other.

This object can also be achieved by a fourth image reproducing device in which a photosensitive film cartridge is mounted, a transfer sheet with a developer pod adhered to the leading end thereof and of the same kind as the pod is fed manually, and a peel-apart type film is used, comprising:

a first sensor for sensing a first code indicative of the type of the photosensitive film and applied to the photosensitive film or the photosensitive film cartridge;

a second sensor for sensing a second code indicative of the kind of the transfer sheet and pod and applied to the transfer sheet; and means for inhibiting the operation of the device when the sensed first and second codes are different from each other.

According to the second image reproducing device of the present invention, the kinds of a photosensitive film and the transfer film are detected to prevent an incorrect combination of them and to inhibit the operation of the device.

According to the third image reproducing device of the present invention, the kinds of a photosensitive film and the transfer film are detected to prevent an incorrect combination of them and to inhibit the operation of the device, and further the use of an undesirable combination of photosensitive film and pod can be prevented beforehand.

According to the fourth image reproducing device of the present invention, the kinds of a photosensitive film and a transfer film are detected to prevent an incorrect combination of them and to inhibit the operation of the device, and further the use of an undesirable different combination of transfer sheet and pod can be prevented beforehand.

A still further object of the present invention is to prevent the use of an undesirable combination of photosensitive film and pod beforehand.

This object can be achieved by a fifth image reproducing device comprising an integral type container in which a photosensitive film and a developer pod of the same kind are contained, a transfer sheet cassette is mounted separately from the container, and a peel-apart type film is used.

According to the fifth image reproducing device of the present invention, the use of an undesirable combination of photosensitive film and pod can be prevented beforehand.

Further objects and advantages of the present invention will be apparent from the following description, reference being had to be accompanying drawings wherein preferred embodiments of the present invention are clearly shown.

BRIEF DESCRIPTION OF THE DRAWINGS

FIG. 18 shows a further embodiment of the sensor which senses the kind of a photosensitive film cartridge.

FIG. 19 shows a further embodiment of the sensor which senses the kind of a photosensitive film cartridge.

FIG. 20 is an embodiment of a photointerrupter with a mechanical sensor.

DESCRIPTION OF THE PREFERRED EMBODIMENTS

Figure 1:
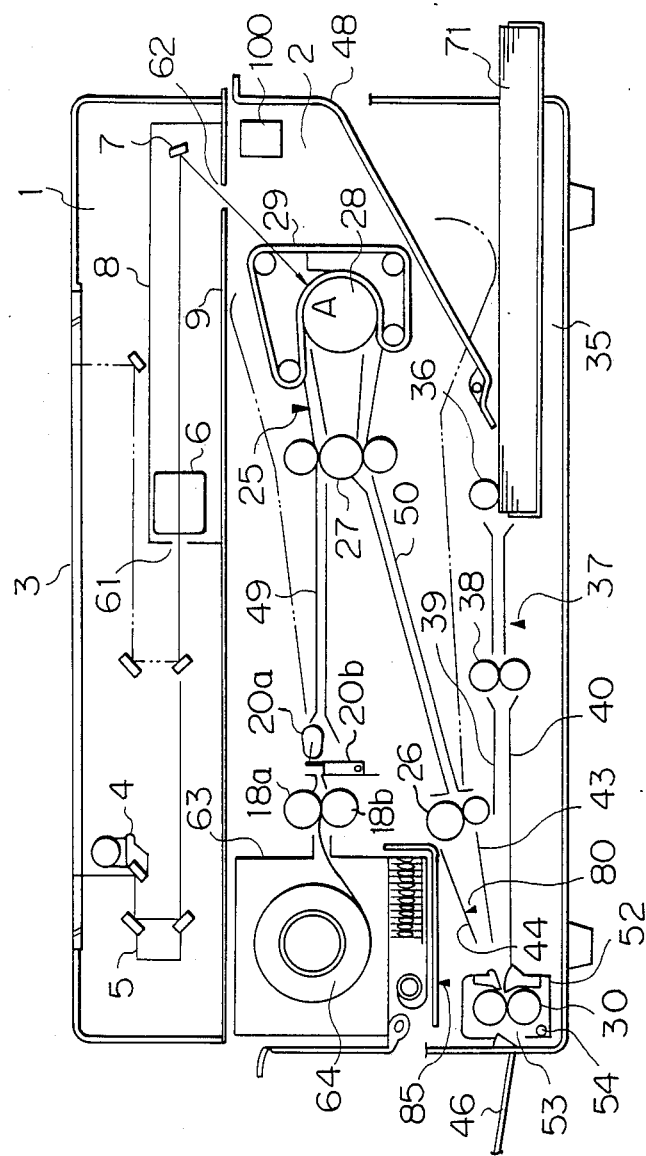
FIG. 1 schematically illustrates an image reproducing device which is one embodiment of the present invention.

Various other objects, features and attendant advantages of the present invention will be more fully appreciated as the same becomes better understood from the following detailed description when considered in connection with the accompanying drawings in which like reference characters designate like or corresponding parts throughout the serveral views and wherein:

FIG.1 illustrates the entire structure of an image reproducing device which uses a peel-apart type instant photographic film. The device includes an optical system unit 1 which scans a document while irradiating the document with illuminating light to create a document image at a predetermined position (exposure plane), and a conveyer 2 which carries a photosensitive sheet to the predetermined position, exposes the photosensitive film there, registers and superposes the photosensitive film and the transfer sheet on each other, spreads a developer therebetween, and transfers an image onto the transfer sheet.

The optical system unit 1 includes a contact glass 3; a first moving unit 4 which comprises a first mirror and a light source; a second moving unit 5 which comprises a second mirror and a third mirror; a lens 6 and a fourth mirror 7. The light source in the first moving unit 4 includes a fluorescent lamp (preferably, of a color effect type for improving color reproduction) which irradiates a document placed face down on the contact glass 3 while scanning the document parallel to the contact glass 3. The second moving unit 5 is scanned in the same direction as the first moving unit at half the speed of the first moving unit to keep the length of the optical path constant.

The light reflected by the document is further reflected by the first, second and third mirrors and strikes the exposure drum 28 through the lens 6, the fourth mirror 7 and a slit 62. A slit 61 is provided before the lens 6 in a light screening cover 8 in order to provide to the exposure section a quantity of light which is distributed uniformly in the width direction. The slit 62 having a minimum required width and provided in the bottom plate is intended to suppress flare light as much as possible. By a combination of the conveyance speed of a photosensitive film and the quantity of fluorescent lamp light, the required quantity of exposure light (illuminance (lux) $\times$ time (sec)) can be provided to the photosensitive film.

The conveyer unit 2 and its operation will be described in detail. The conveyer unit 2 includes a roll-like photosensitive film feeder, a cutter unit for cutting away a sheet of film from the fed photosensitive film, a conveyance and exposure unit for the sheet of photosensitive film, a conveyer unit for a transfer sheet and a developing unit. As will be described later in more detail, a photosensitive film 64 having the same width as the transfer sheet and accommodated in the form of a roll within a light screening cartridge 63 is conveyed by the rotation of a pair of pull-out rollers 18a and 18b and intermediate rollers 27. When the leading end of the photosensitive film 64 is sensed by a sensor 25, or a predetermined time thereafter, a rotating cutting edge 20a is rotated downwardly contacting a fixed cutting edge 20b to thereby cut away a sheet of film from the rolled photosensitive film 64. The distance between the cutting position and the exposure position A is set longer than the length of latent image formed on the photosensitive sheet 70 to thereby prevent a shortage in the length of the photosensitive sheet 70 caused by the changes in the conveyance speed due to the impact caused by cutting the film during exposure.

After cutting, the photosensitive sheet 70 is again conveyed by the intermediate rollers 27 to the exposure drum 28 and exposed at the position A on the drum 28 through the optical system so that a latent image is formed on the photosensitive sheet.

The optical system unit 1 starts to scan in time with the arrival of the leading end of the image ara on the photosensitive sheet 70 at the exposure position A. The drum 28 is rotated synchronously with the scanning speed of the optical system to thereby move an endless belt 29 extended along half the outer periphery of the drum 28 under given tension.

The photosensitive sheet 70 is held by its edges outside its image area between the belt 29 and drum 28 to be moved together with the drum 28 at the same speed to thereby change direction by 180 degrees and is carried until the leading end of the photosensitive sheet 70 hits the pair of developing rollers 30 by means of intermediate rollers 27 and rollers 26.

The peripheral speed of the drum 28 is set somewhat greater than the peripheral speed of the intermediate roller 27 which has an overrun mechanism. Therefore, the photosensitive sheet 70 is conveyed along the drum 28 in a slightly tensioned manner. A curl which would otherwise be produced is corrected by half winding the photosensitive sheet 70 around the drum 28, so that the photosensitive sheet 70 closely contacts the drum 28. Thus the length of the optical path to the photosensitive sheet 70 surface and the sheet conveyance speed are maintained at a constant value. The conveyance, cutting and exposure of the photosensitive film 64 and the photosensitive sheet 70 are performed within a dark space in the device by screening external light, using an outer screen (not shown).

The transfer sheet 71 is different from the photosensitive sheet 70 in that it lacks photosensitivity and can be inserted into the device externally.

In this particular embodiment, a plurality of transfer sheets 71 are accommodated in a cassette 35 which is mounted through an opening provided in the lower right-hand device side, as seen in FIG. 1. The loaded transfer sheets 71 are separated and conveyed one by one by the feed roller 36 and a separating unit (not shown). When the leading end of the conveyed transfer sheet 71 is sensed by the sensor 37, the insertion rollers 38 are rotated.

Figure 2:
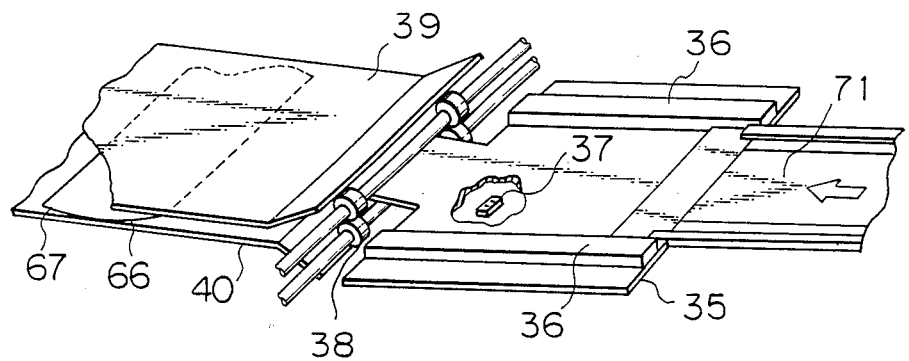
FIG. 2 is a perspective view of a transfer sheet conveyer of the device shown FIG. 1.

The transfer sheet 71 is conveyed by the insertion roller 38 to between the guide plates 39 and 40 and is stopped when the leading end of the transfer sheet 71 hits on the nip of the pair of developing rollers 30. The guide plate 39 has a light screening Mylar (Trade mark) layer 66 attached to the entire surface of the guide plate 38 with a teremp 67 or the like attached at the leading end of the Mylar layer 66, as shown in FIG. 2. The teremp 67 is a pile woven fabric piled by mohair or wool yarn. The Mylar layer 66 is pressed downwardly against the guide plate 4 by a slight force caused by its own rigidity. The transfer sheet 71 is carried while being slid on the guide 40 and the teremp 67 at the leading end of the Mylar layer 66.

By screening light from the transfer sheet conveyance path, the photosensitive sheet 70 is prevented from being exposed to external light which would otherwise enter the conveyance path.

Figure 3:
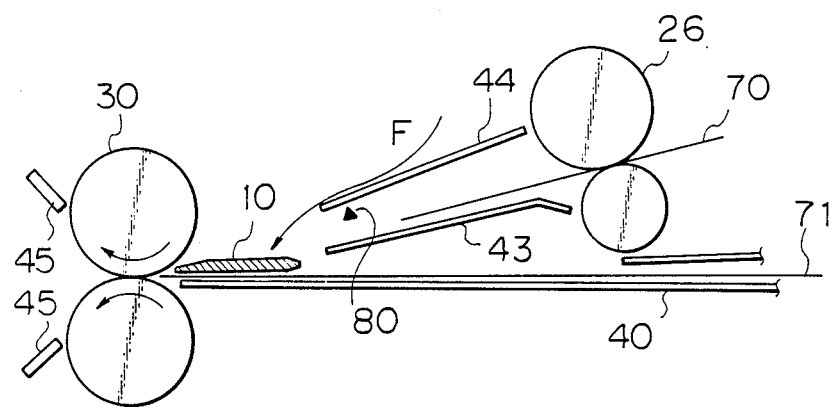
FIG. 3 is a side view of a portion of the FIG. 1 device where a photosensitive sheet and a transfer sheet merge.

FIG. 3 illustrates a portion of the device of this particular embodiment in which the pair of developing rollers 30 is provided. Both the photosensitive sheet 70 and the transfer sheet 71 are caused to coincide in position by causing the leading ends of the sheets 70 and 71 to hit on the nip of the single pair of rollers 30. Therefore, a complicated coincidence mechanism is not needed so that the device is inexpensive and compact. The pair of rollers 30 is composed of a pair of metal straight rollers pressed against each other. When the pair of rollers 30 are stopped, the leading end of the transfer sheet 71 hits on the nip of the rollers 30 earlier than the leading end of the photosensitive sheet 70 and stops there on standby.

By rolling a tape around a reel as will be described later in more detail, one pod 10 drops from a retainer. As shown in FIG. 3, the guide plate 44 is inclined downwardly toward the pair of rollers 30, the guide plate 40 is also inclined downwardly or maintained horizontally, so that the dropping pod 10 slides along the guide plate 44, drops in the space between the pair of rollers 30 on one side, and the guide plates 44 and 43 on the other side, the leading end of the pod 10 hits on the nip of the pair of rollers 30 on the stopped transfer sheet 71 and stops, as shown by the arrow F. Thereafter, the photosensitive sheet 70 which has already been exposed, is conveyed by the rollers 26 between the guide plates 43 and 44, passes over the stopped pod 10, and hits its leading end on the nip of the rollers 30.

The feeding, cutting-away and exposure of the photosensitive film 64 is controlled so as to be inhibited when the sensor 37 of FIG. 2 senses no transfer sheet 71 or when the sensor 80 of FIG. 3 senses no passage of the pod 10. Forgetting to insert a transfer sheet 71 or a bad supply of a pod 10 is prevented for example, by means which prevents a print switch from being pressed. Similarly, when the sensor 37 senses no transfer sheet 71, control is provided so that the supply of a pod 10 is inhibited. Thus useless consumption of a pod 10 and a photosensitive film 64 due to bad conveyance of the transfer sheet 71 is prevented.

After the photosensitive sheet 70, transfer sheet 71 and pod 10 hit the nip of the rollers 30 and the leading ends of the film and sheet are caused to coincide, the pair of rollers 30 is rotated to convey the photosensitive sheet 70, transfer sheet 71 and pod 10. At this time, the pod 10 is crushed, and a developer is spread between the photosensitive sheet 70 and the transfer sheet 71 so that development including transfer of a negative latent image to the transfer sheet 71 and fixing the image is effected. The pair of rollers 30 is required to have a degree of straightness enough to spread the developer uniformly or in a given thickness. To this end, a pair of resilient blades 45 contacts the corresponding discharge sides of the pair of rollers 30 under a given pressure, as shown in FIG. 3, to wipe off any developer appearing outside of the photosensitive sheet 70 and the transfer sheet 71 to thereby prevent damage to the desirable degree of straightness due to hardening of the developer.

When a drive source for the pair of rollers 30 includes a drive source for the exposure section, the conveyance speed of the exposure section is influenced by fluctuations of the load on the pair of rollers 30 at the start up of the drive source and the impact on the pair of rollers when the transfer sheet 71 and photosensitive sheet 70 pass through the pair of rollers 30. This undesirable influence is eliminated by setting the distance from the exposure position A to the nip of the pair of rollers 30 greater than the distance between the leading end of the photosensitive sheet 70 and the rear end of a latent image formed on the photosensitive sheet 70.

The developed photosensitive sheet 70 and the transfer sheet 71 are both discharged together to the discharge tray 46 since they are held together by the developer. If the photosensitive sheet 70 is peeled from the transfer sheet 71 a dozen seconds thereafter, a positive color image is transferred to the transfer sheet 71.

When an unsatisfactory conveyance of the photosensitive sheet 70 and transfer sheet 71 occurs in the device, the operator can remove a jammed sheet, if any, out of the device by rotating or opening a cover which screens light when closed and guide plates 49 and 50 to the positions shown by the dot-dot-dashed lines in FIG. 1.

The maintenance (cleaning, etc.,) of the pair of rollers 30 is performed by moving the pair of rollers 30 out of the device by rotating an assembly of a frame 52, a discharge guide 53 and the pair of rollers 30 leftwardly around an axle 54. The tray 46 is removed before this operation.

Figure 4:
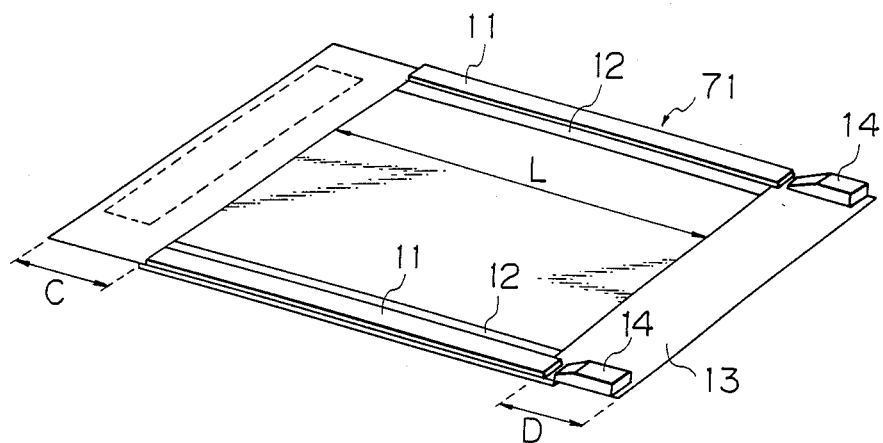
FIG. 4 is a perspective view of a transfer sheet used in the device of FIG. 1.
Figure 5:
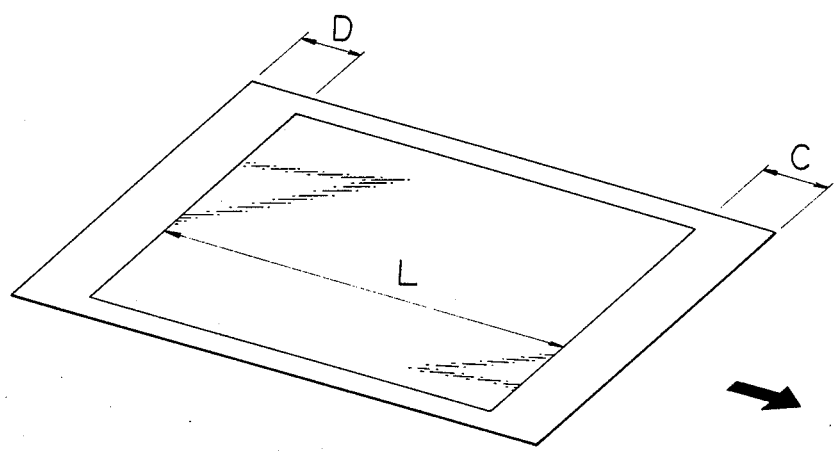
FIG. 5 illustrates a range on a cut-away photosensitive sheet in which a latent image is formed.

In FIGS. 4 and 5, a film will be described which is used in an image forming system of the present device. This instant photographic film includes a photosensitive sheet 70, a transfer sheet 71 (printing paper) and a pod 10 which includes a developer pack. The photosensitive sheet 70 is exposed by the optical system unit 1, the transfer sheet 71 and the photosensitive sheet 70 are then caused to coincide at their leading ends, and pass together with the pod 10 between the pressured pair of rollers 30. At this time, a seal in the pod 10 is broken and the developer is spread evenly between the transfer sheet 71 and the photosensitive sheet 70. Thus development starts, the photosensitive sheet 70 is colored in dozen seconds, and a color former is transferred to the transfer sheet 71. If the photosensitive sheet 70 is then peeled from the transfer sheet 71, a positive color image is formed on the transfer sheet 71.

In order to prevent the spread developer from leaking from both ends of the transfer sheet 71, a peelable side rail 11, for example, of a paper tape-like strip adhered to the printing surface, is attached along each of the sides of the transfer sheet 71 outside the image forming area. A mask sheet 12 which defines the image forming area on the transfer sheet 71 may be attached peelably along each of four sides of the transfer sheet 71.

Each side rail 11 has a given thickness of about 0.1 mm, so that when the combined photosensitive sheet 70 and transfer sheet 71 pass between the pressured pair of rollers 30, the thickness of the developer spread between the two side rails 11 is kept constant because the viscosity of the developer is high. A trap 13 which stores a peelable developer is provided at the trailing end of the transfer sheet 71 in order to prevent excess developer from being pressed out and making the pair of rollers dirty. A wedge 14 having a thickness of about 2 mm is provided at each of ends of the trap 13 to cause the spread developer to be stored between the wedges 14 on the trap 13.

The length of the seal in the pod 10 must be narrower than the width of the side rail 11 which prevents the developer from flowing out from the sides. The developer must move over a certain distance to arrive at each side rail 11. Since a good image is not formed or transferred over the entire area of the sheet, a latent image is formed on the photosensitive sheet 70 starting at a length C from the leading end of the photosensitive sheet 70. In order to prevent excess developer from being pressed out at the rear end of the transfer sheet and adhering to the pair of rollers 30, the transfer sheet 71 has a sufficient length at its trailing end corresponding to the length of the trap 13 (D).

Therefore, the photosensitive sheet 70 must have a length equal to the distance from the leading end of the transfer sheet 71 to the rear end of the trap 13. From the above, the cut sheet of photosensitive sheet 70 has some margins C and D at the leading and trailing ends, respectively, of the image formation area thereof having a length L as shown in FIG. 5.

For the transfer sheet 71, the side rails 11 and wedges 14 may be removed by providing a mechanism in which the distance between the rollers 30 is held at a predetermined value, for example, of about 0.35 mm over the image section and the roller distance is enlarged (to about 2 mm) when the trailing ends of the both sheet 70 and 71 leaves the rollers 30.

Figure 6:
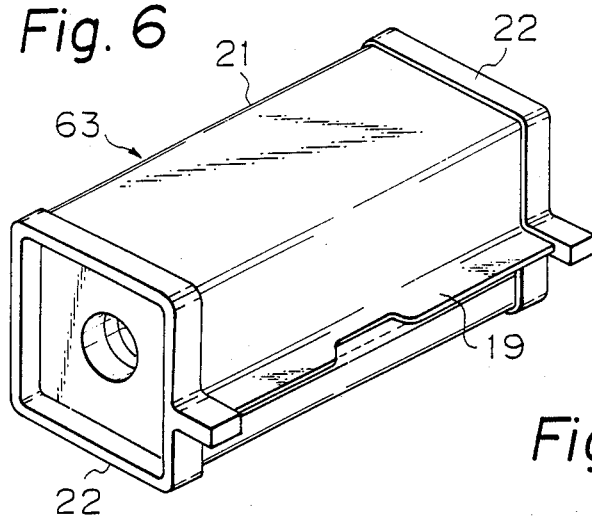
FIG. 6 is a perspective view of a photosensitive film cartridge.
Figure 7:
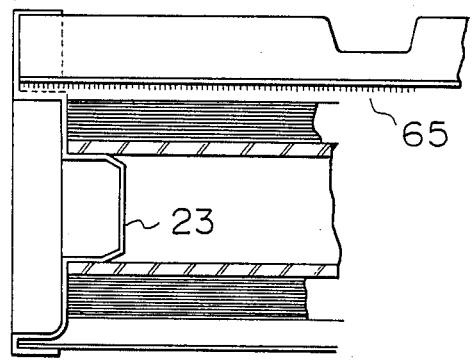
FIG. 7 is a partial cross-section view of the cartridge of FIG. 6.
Figure 8:
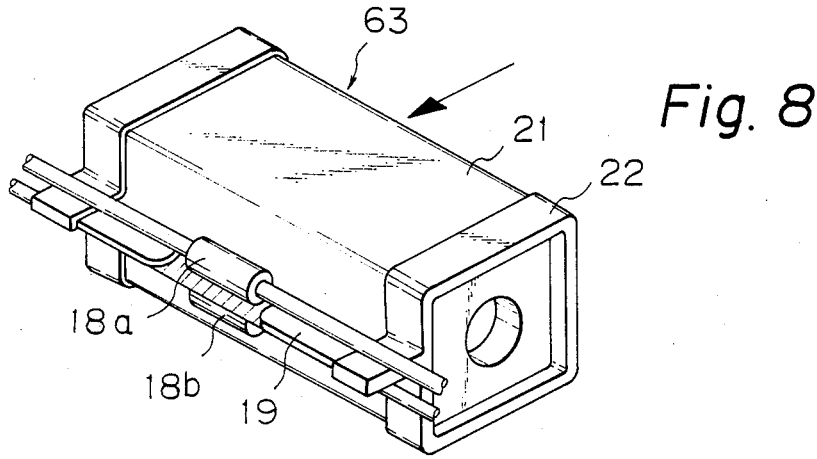
FIG. 8 is a perspective view of the FIG. 6 cartridge from which an end of a photosensitive film is drawn out.

The supply of a photosensitive sheet 70 and a pod 10 will be explained. As shown in FIGS. 6 and 7, the photosensitive film cartridge 63 includes a cylindrical body 21 of light-screening thick paper, light-screening plastic sheet or a laminate of aluminum foil and ligh-screening thick paper or plastic film, and a pair of end members 22 into which the corresponding ends of the cylindrical body are inserted. Each end member 22 has a boss 23 which rotationally supports the film shaft core. A film guide 19 protrudes from the cylindrical body and has a piece of velvet 65 having long nap adhering to the guide 19 along its overall width to prevent light from entering the film cartridge. The outer edge of the guide 19 causes the end of the photosensitive film 64 to reliably enter between the pair of rollers 18a and 18b so that when the rollers 18a and 18b are moved toward each other so as to press the film, the initial drawn length of the photosensitive film 64 is restricted, as shown in FIG. 8. A label may be adhered to the outside of the cartridge 63 so that the kind of the photosensitive film 64 mounted at present in the cartridge can be seen externally.

Figure 9:
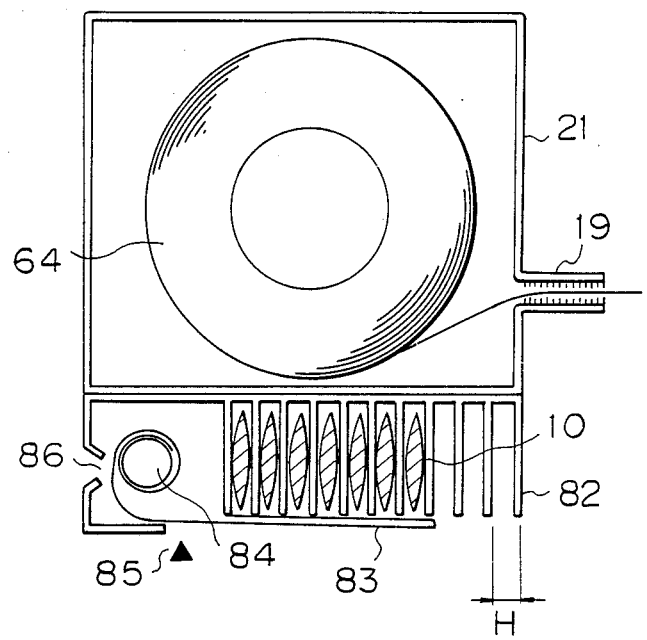
FIG. 9 is a cross section view of a photosensitive film cartridge and a pod receptacle provided integrally with each other.
Figure 10:
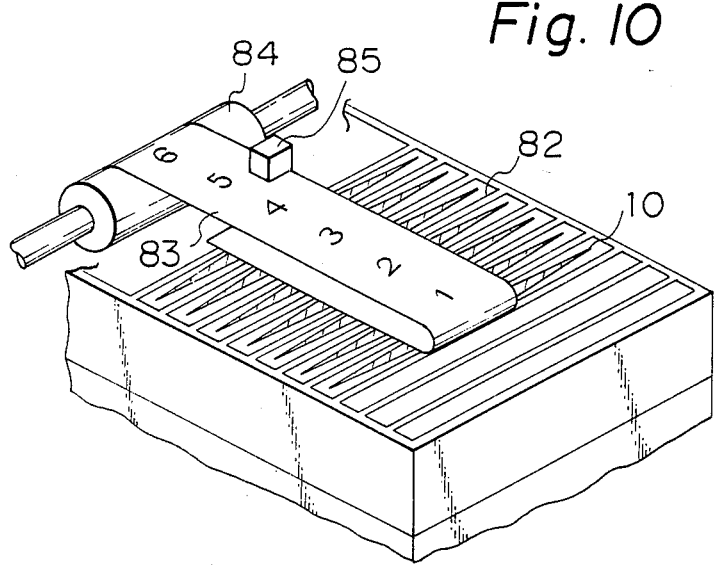
FIG. 10 is a perspective view of the pod receptacle as viewed diagonally from below.

In this particular device, a plurality of pods 10, their receptacle, and a pod feed mechanism are provided under the photosensitive film cartridge 63. As shown in FIG. 9, a plurality of partitioned retainers 82 is provided under the cartridge 63 with one pod 10 contained in each retainer 82. As shown in FIGS. 9 and 10, a tape 83 having a predetermined width is peelably adhered to all the ends the retainers 82 in a folded manner to thereby prevent of the pods 10 from dropping. The tape 83 is wound around a reel 84, which is rotated or driven by drive means (not shown) within the cartridge 63 or drive means (not shown) in the device.

As described above, after the leading end of the transfer sheet 71 hits the pair of rollers 30, the reel 84 rolls the tape 83 by a length equal to twice the partition distance (2H), so that one retainer 82 is opened and the corresponding pod 10 falls due to its own weight. The number of retainers 82 is the same as the number of photosensitive sheets 70 cut away from the roll of photosensitive film 64. Therefore, when the pods 10 are used up, the photosensitive film 64 is also used up, so that the pods 10 and the photosensitive film 64 are not wasted.

Since one pod 10 is consumed per photosensitive sheet 70, the number of remaining pods 10 is equal to the number of the remaining photosensitive film sheets 64. Since the tape 83 is wound by 2H for each copy, the remaining quantity of the photosensitive film 64 can be displayed through a display window 86 by numerals marked at intervals of 2H on the tape 83, as shown in FIG. 10.

It is possible to prevent useless feeding of the photosensitive film 64 and pods 10 if the tape 83 is coated with black or white such that when the pods 10 are used up, the end of the tape 83 is sensed by a reflective sensor 85 fixed in the body, and if a control is provided such that when the sensor 85 senses the tape end, the print switch cannot be pressed. Furthermore, if the sensor 85 is set so as to generate the same signal in the absence of the film cartridge 63, as when the black-coated portion is sensed, it is not possible to forget to insert the photosensitive film cartridge 63.

Other embodiments of the present invention will now be described with reference to FIGS. 11 to 22. The component of the particular embodiment which is the same as that of the embodiment of FIG. 1 is given the same reference numeral as that given to the latter.

Figure 11:
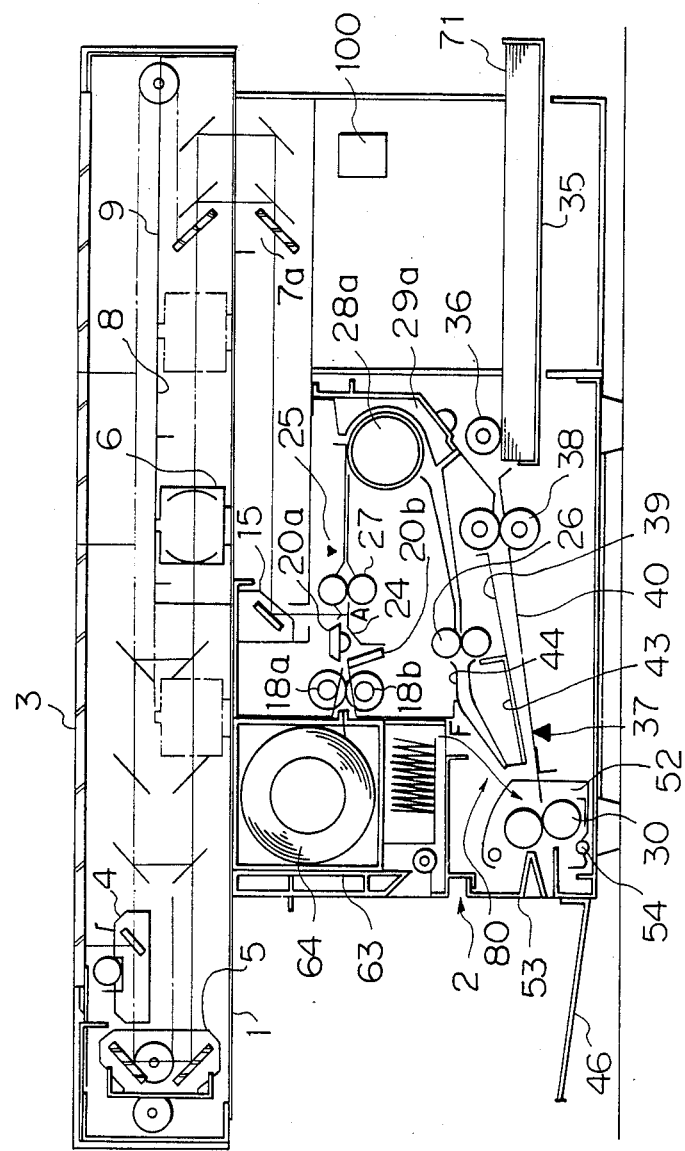
FIG. 11 schematically illustrates an image reproducing device which is another embodiment of the present invention.

FIG. 11 illustrates the entire structure of an image reproducing device which uses a peel-apart type instant photographic film. The device includes an optical system unit 1 which scans a document while irradiating the document with illuminating light to create a document image at a predetermined position (exposure plane), and a conveyer 2 which carries a photosensitive sheet to the predetermined position, exposes the photosensitive sheet there, registers and superposes the photosensitive sheet and the transfer sheet on each other, spreads a developer therebetween, and transfers an image onto the transfer sheet.

The optical system unit 1 includes a first moving unit 4 which comprises a contact glass 3, a first mirror and a light source; a second moving unit 5 which comprises a second mirror and a third mirror; a third moving unit 7a which comprises a lens 6, a fourth mirror and a fifth mirror; and a sixth mirror 15. The light source included in the first moving unit 4 includes a fluorescent lamp (preferably, of a color effect type for improving color reproduction) which irradiates a document placed face down on the contact glass 3 while scanning the document parallel to the contact glass 3. The second moving unit 5 is scanned in the same direction as the first moving unit 4 at half the speed of the first moving unit 4 to keep the length of the optical path constant.

The magnification by zooming and the conjugate length are adjusted by the movement of the lens 6 and the third moving unit 7a (shown by the dot-dashed line in FIG. 11).

The light reflected by the document is further reflected by the first, second and third mirrors and strikes the exposure section A through the lens 6, the fourth, fifth and sixth mirrors.

A light-screening cover 8 is provided so as to cover the periphery of the lens, and a light-screening cover 9 is fixed to the optical system bottom plate. The light-screening cover 8 is moved together with the lens 6 while contacting the light-screening cover 9 through a teremp, etc. This arrangement provides the utmost prevention of the entrance of flare light through the periphery of the lens 6.

The conveyer unit 2 and its operation will be described in detail. The conveyer unit 2 includes a roll-like photosensitive film feeder, a cutter unit for cutting away a sheet of film from the fed photosensitive film, a conveyance and exposure unit for the sheet of photosensitive film and a conveyer and developing unit for a transfer sheet. As will be described later in more detail, a photosensitive film 64 having the same width as the transfer sheet and accommodated in the form of a roll within a light screening cartridge 63 is conveyed onto the guide plate 24 by the rotation of a pair of pull-out rollers 18a and 18b and intermediate rollers 27.

When the leading end of the photosensitive film 64 is sensed by a sensor 25, or a predetermined time thereafter, the first and second moving units 4 and 5 are scanned, and the photosensitive film 64 is exposed at the exposure position A and a latent image is formed.

The exposure section A has a flat surface throughout the slit area and is provided flush with, or higher than, the pairs of rollers 18 and 27. The peripheral speed of the pair of rollers 27 is set slightly higher than that of the pair of rollers 18. The pair of rollers 18 have an overrun mechanism.

By this arrangement, the photosensitive film 64 is conveyed slightly tensioned through the exposure section A, and can be conveyed closely contacting the guide plate 24, and the length of the optical path to the surface of the photosensitive film 64 and the conveyance speed can be maintained at a constant value.

The photosensitive film 64 which has been exposed to form a latent image thereon is temporarily stopped after it has moved a certain distance. Thereafter, the rotating edge 20a is rotated while contacting the fixed edge 20b to thereby cut away a sheet of the photosensitive film 64 with the latent image thereon from the remaining film.

The timing with which the photosensitive film 64 is stopped is provided by counting a time t elapsing after the sensor 25 has detected the leading end of the photosensitive film 64.

Although the scanning speed of the optical system is changed by zooming, the conveyance speed of the photosensitive film 64 is constant. Therefore, if the photosensitive film 64 is stopped and cut away a predetermined time t after the leading end of the film is sensed, a predetermined length of photosensitive sheet 70 is obtained.

Therefore, image formation is impossible over at least the distance, represented by I, from the exposure position A to the leading end of the fixed edge 20b on the trailing end portion of the cut sheet of photosensitive film 70. However, if the exposure position A and the cutter are disposed such that the distance I is shorter than the distance from the trailing end of the transfer sheet to the trailing end (D in FIG. 4) of an image section which is transferred to the transfer sheet 71, as will be described later in more detail, the useless consumption of the photosensitive film 64 (cutting away more than a necessary length of film sheet) is prevented.

Similarly, a latent image cannot be formed on at least the leading area of the cut-away sheet of photosensitive sheet 70, represented by J, from the position where the sensor 25 senses the leading end of the photosensitive sheet 70 to the exposure position A. However, if the exposure position A and the sensor 25 are disposed such that the distance J is selected so as to be less than the distance, represented by C in FIG. 4, from the leading end of the transfer sheet 71 to the leading end of the image section transferred to the transfer sheet 71 as will be described later in more detail, useless consumption of the photosensitive film 64 is prevented.

Furthermore, according to the particular system, the photosensitive film 64 is cut away after the exposure has completely ended. Thus a change in the conveyance speed due to the impact produced by cutting away the photosensitive film 64 during the exposure is completely prevented.

The cut-away sheet of photosensitive sheet 70 is altered through about 180 degrees in direction by the roller 28a and guide plate 29a, and the photosensitive sheet 70 is carried until its leading end hits on the pair of rollers 30 by the roller 26.

The conveyance, exposure and cutting-away of the photosensitive film 64 and the sheet 70 are effected in a dark place within the device which screens out external light.

The transfer sheet 71 differs from the photosensitive sheet 70 in that it has no photosensitivity, so that it can be inserted externally into the device. In this particular embodiment, the cassette 35 which accommodates a plurality of transfer sheets 71 is inserted into the device through an opening provided in the lower right-hand side, as seen in FIG. 11. The stacked transfer sheets 71 are separated and conveyed one by one by the feed roller 36 and the separating unit (not shown). The separated transfer sheet 71 is conveyed by the insertion roller 38 between the guide plates 39 and 40, and stops a predetermined time after the leading end of the transfer sheet 71 is sensed by the sensor 37, namely, when the leading end of the transfer sheet 71 hits the nip of the pair of rollers 30.

Figure 12:
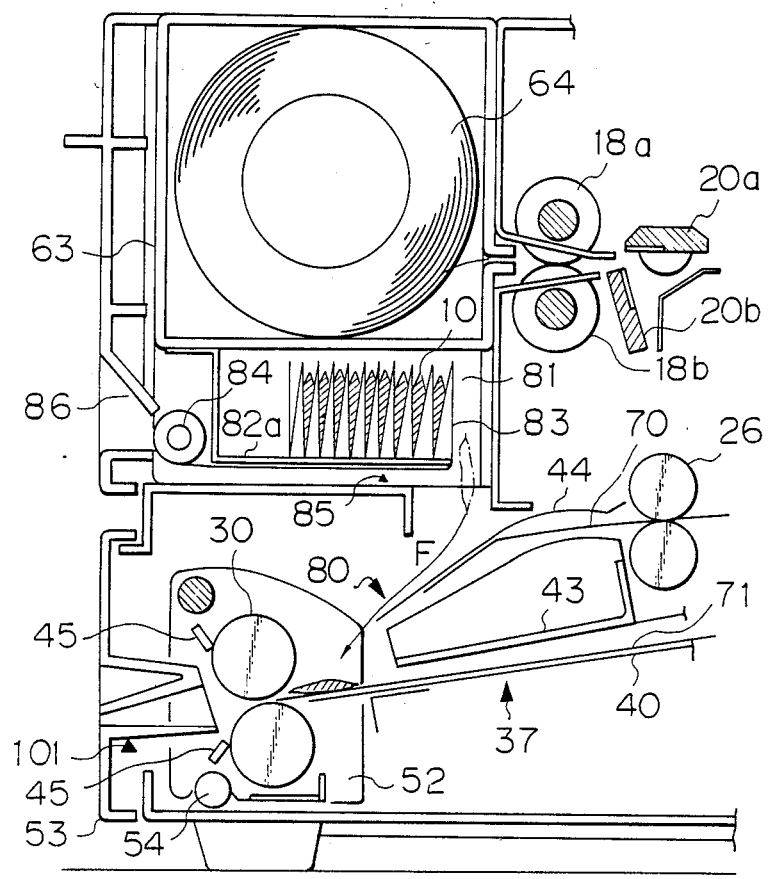
FIG. 12 is a side view of a portion of the FIG. 10 device in which a potosensitive sheet and a transfer sheet merge.

FIG. 12 illustrates a portion of the device of this particular embodiment in which the pair of developing rollers 30 is provided. Both the photosensitive sheet 70 and the transfer sheet 71 are caused to coincide in position by causing the leading ends of the sheets 70 and 71 to hit on the nip of the single pair of rollers 30. Therefore, a complicated coincidence mechanism is not needed so that the device is inexpensive and compact. The pair of rollers 30 is composed of a pair of metal straight rollers pressed against each other. When the pair of rollers 30 is stopped, the leading end of the transfer sheet 71 hits on the nip of the rollers 30 earlier than the leading end of the photosensitive sheet 70 and stops there on standby.

By rolling a tape around a reel as will be described later in more detail, one pod 10 drops from the retainer. As shown in FIG. 12, the guide plate 44 is inclined downwardly toward the pair of rollers 30. The guide plate 40 is also inclined downwardly or maintained horizontally, so that the dropping pod 10 slides along the guide plate 44, drops in the space between the pair of rollers 30 on one side, and the guide plates 44 and 43 on the other side, the leading end of the pod 10 hits the nip of the pair of rollers 30 on the stopped transfer sheet 71 and stops, as shown by the arrow F. Thereafter, the photosensitive sheet 70 which has already been exposed, is conveyed by the rollers 26 between the guide plates 43 and 44, passes over the stopped pod 10, and causes to hit at its leading end on the nip of the rollers 30.

The feeding, cutting-away and exposure of the photosensitive film 64 is controlled so as to be inhibited when the sensor 37 of FIG. 12 senses no transfer sheet 71 or when the sensor 80 of FIG. 12 senses no passage of the pod 10. Forgetting to insert a transfer sheet 71 or a bad supply of a pod 10 is prevented, for example, by means which prevents a print switch from being pressed. Similarly, when the sensor 37 senses no transfer sheet 71, the supply of a pod 10 is inhibited. Thus useless consumption of a pod 10 and a photosensitive film 64 due to bad conveyance of the transfer sheet 71 is prevented.

After the photosensitive sheet 70, transfer sheet 71 and pod 10 hit the nip of the rollers 30 and the leading ends of the film and sheet are caused to coincide, the pair of rollers 30 is rotated to convey the photosensitive sheet 70, transfer sheet 71 and pod 10. At this time, the pod 10 is crushed, a developer is spread between the photosensitive sheet 70 and the transfer sheet 71 so that the development including transfer of a negative latent image to the transfer sheet 71 and fixing the image is effected. The pair of rollers 30 is required to have a degree of straightness enough to spread the developer uniformly or in a given thickness. To this end, a pair of resilient blades 45 contacts the corresponding discharge sides of the pair of rollers 30 under a given pressure, as shown in FIG. 12, to wipe off any developer appearing outside of the photosensitive sheet 70 and the transfer sheet 71 to thereby prevent damage to the desirable degree of straightness due to hardening of the developer.

The developed photosensitive sheet 70 and the transfer sheet 71 are both discharged to the discharge tray 46 as they are adhered closely by the developer. If the photosensitive sheet 70 is peeled from the transfer sheet 71 a dozen seconds thereafter, a positive color image is transferred to the transfer sheet 71.

The maintenance (cleaning, etc.,) of the pair of rollers 30 is performed by moving the pair of rollers 30 out of the device by rotating an assembly of a frame 52, a discharge guide 53 and the pair of rollers 30 leftwardly around an axle 54. At this time, the tray 46 is removed before this operation.

An instant photographic film used in this particular embodiment includes a photosensitive sheet 70 and a transfer sheet 71 (printing paper) and a pod 10 which includes a developer pack, and the film is similar to that described in FIGS. 4 and 5.

The photosensitive film cartridge 63 used in the particular embodiment is similar to that described in FIGS. 6 and 7.

In this particular embodiment, a plurality of pods 10, their receptacle, and a pod supply mechanism are provided integrally below the photosensitive film cartridge 63. If the kind of a photosensitive film 64 (for example, a color film, a black-and-white film or an OHP film) changes, the developer enclosed in the pod 10 must be changed correspondingly. However, since the photosensitive film 64 and the pod 10 are mounted integrally, the use of an undesirable different combination of photosensitive film 64 and pod 10 can be prevented beforehand.

As shown in FIGS. 11 and 12, a chamber 81 is provided below the photosensitive film cartridge 63 in which a tape 83 folded like a bellows and a plurality of pods 10 are contained. The pods 10 are each adhered peelably to the bellows bottoms through the width t (see FIG. 13). The tape 83 extends below the bottom plate 82a from an opening K in the chamber 81 and is wound around a reel 84. The reel 84 is rotated by drive means (not shown) in the cartridge 63 or drive means (not shown) in the device body.

Figure 13:
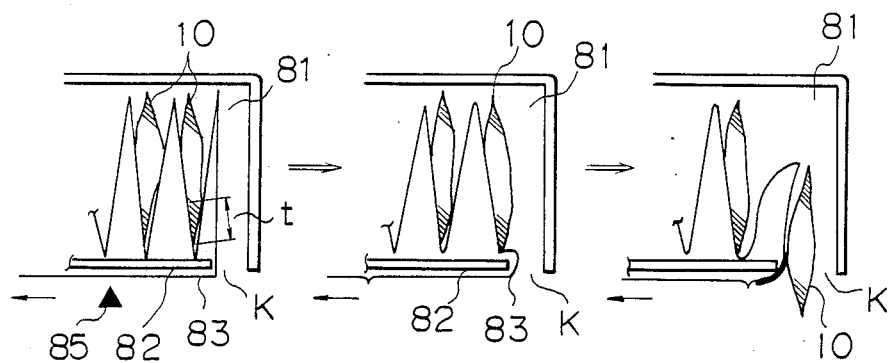
FIG. 13 illustrates the supply of a pod from the pod receptacle in the FIG. 10 device.

As described above, after the leading end of the transfer sheet 71 hits on the pair of rollers 30, the reel 84 rolls the tape 83 by a predetermined length. By this rolling operation, the tape 83 and pods 10 are operated as shown in FIG. 13. The tape 83 is bent through about 90 degrees by the bottom plate 82a, and thus one pod 10 is separated from the tape 83. The separated pod 10 drops due to its own weight in the track shown by the arrow F in FIG. 12.

Figure 14:
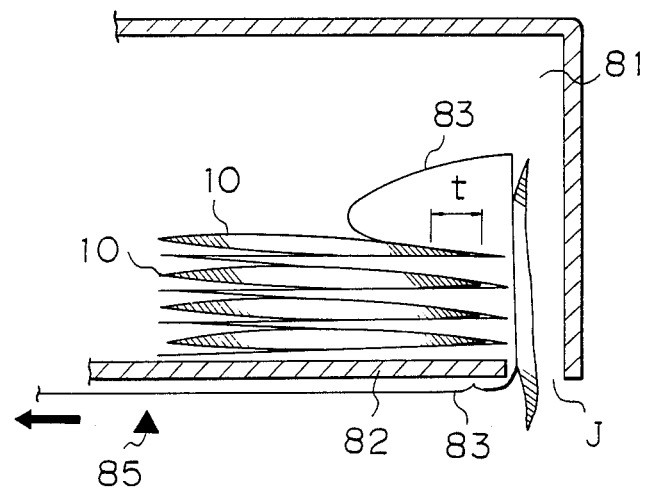
FIG. 14 is a partial cross section view of a modification of the pod receptacle.

While in the particular embodiment the pods 10 are arranged so as to form a horizontal array of vertical pods, they may be arranged so as to form a vertical array, or a stack, of horizontal pods, as shown in FIG. 14, to feed the pods one by one. The number of pods 10 is the same as the number of photosensitive sheets 70 cut away from the roll of photosensitive film 64. Therefore, when the pods 10 are used up, the photosensitive film 64 is also used up, so that the pods 10 and the photosensitive film 64 are not wasted.

Since one pod 10 is consumed per photosensitive sheet 70, the number of remaining pods 10 is the same as the number of remaining photosensitive film sheets 64. Since the tape 83 is wound by a predetermined length for each copying, the remaining quantity of the photosensitive film 64 can be displayed through a display window 86 by numerals marked at intervals of the predetermined length on the tape 83.

It is possible to prevent useless feeding of the photosensitive film 64 and pods 10 if the tape 83 is coated with black or white such that when the pods 10 are used up, the end of the tape 83 is sensed by a reflective sensor 85 fixed in the body, and if control is provided such that when the sensor 85 senses the tape end, the print switch cannot be pressed. Furthermore, if the sensor 85 is set so as to generate the same signal in the absence of the film cartridge 63, as when the black-coated portion is sensed also it is possible to prevent forgetting the insertion of the photosensitive film cartridge 63.

As described above, according to the present invention, the kinds of photosensitive film 64, transfer sheet 71 and pods 10 are detected to prevent an incorrect combination.

Figure 15A:
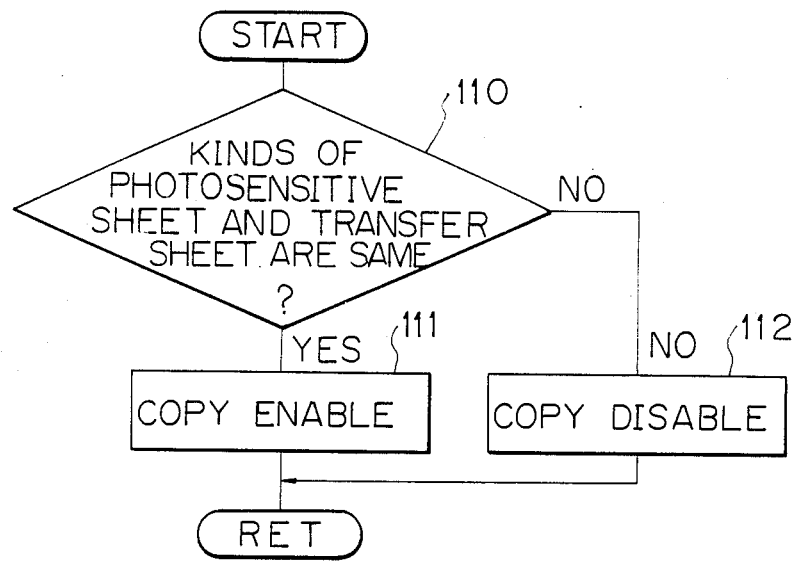
FIGS. 15a and 15b are a control flowchart carried out according to the present invention.
Figure 15B:
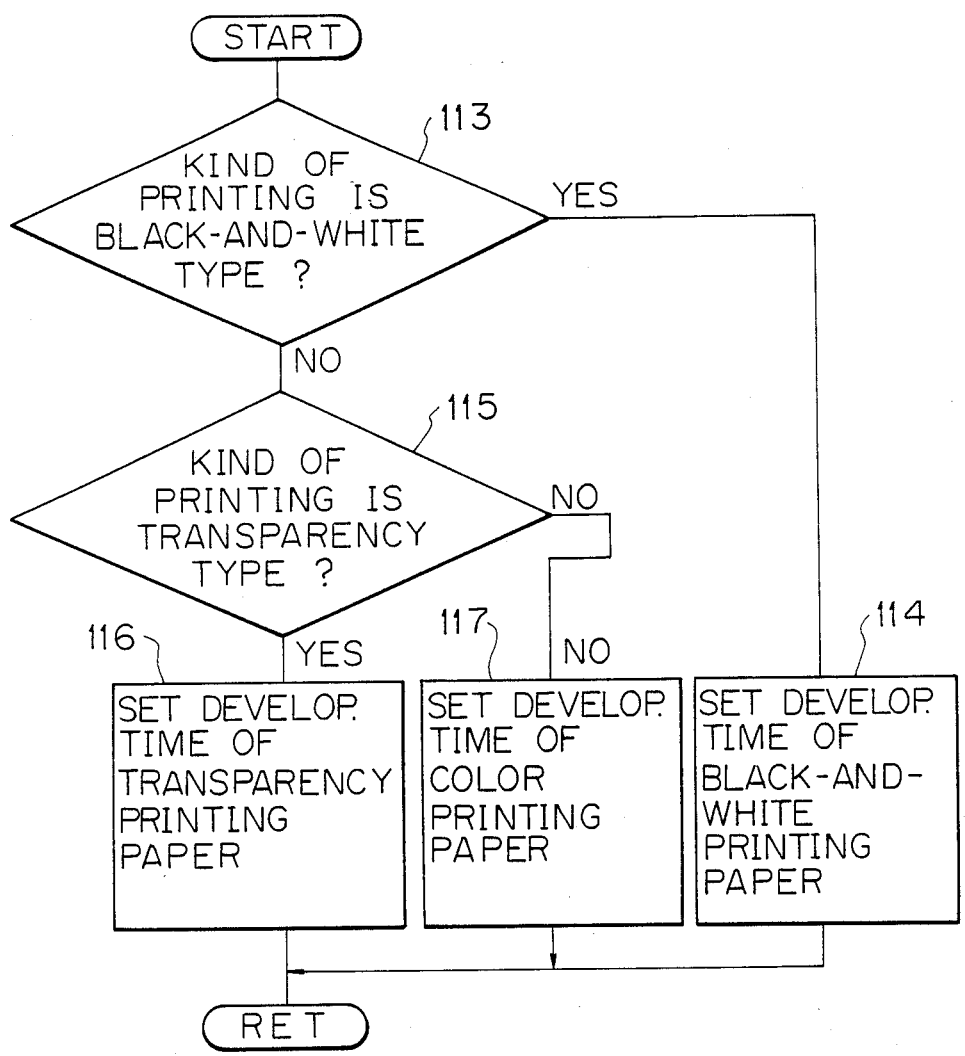

FIG. 15 is a flowchart for control of that operation. FIG. 15a illustrates the operation where the kinds of the photosensitive film and the transfer sheet are judged to be the same at the stop 110, thus enabling a copy at the step 111 while, otherwise, a copy is inhibited at the step 112. FIG. 15b illustrates the setting of a development time effected in accordance with the kinds of a transfer sheet. If the kind of printing is judged to be black-and-white type at the step 113, it enables setting the development time of a black-and-white printing paper at the step 114, while, otherwise, the kind of printing is judged to be transparency type or not at the step 115. If it is transparency type, it enables setting the development time of transparency printing paper at the step 116 while, otherwise, it enables setting the developing time of color printing paper at the step 117.

These control operations are performed by control units 100 of the devices shown in FIGS. 1 and 11.

Figure 16:
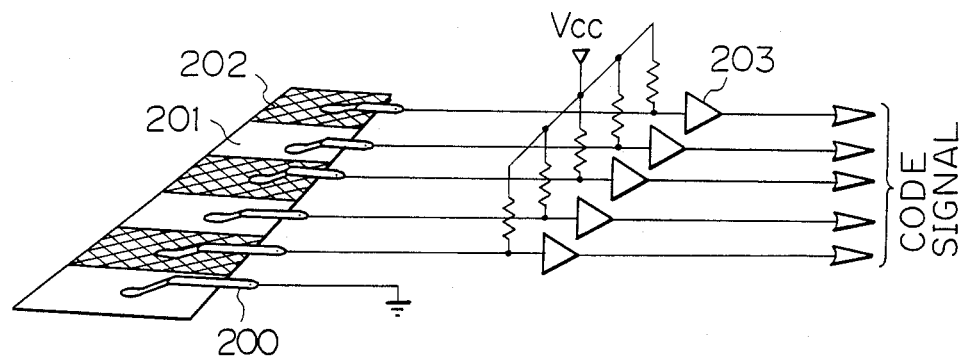
FIG. 16 shows an embodiment of a sensor which senses the kind of a photosensitrive film cartridge.

FIG. 16 and subsequent Figures show a specific sensor mechanism. In the following embodiments, a photosensitive film cartridge 63 will be described as an example. In the mechanism of FIG. 16, a plurality of electrodes 200 picks up, as an electrical signal, a code (sign) provided on the surface of the film cartridge 63 like a DX code on a 35-mm film. The code includes a conductive member 201, for example, of aluminium foil, and a plurality of insulating coatings 202 provided on the conductive member. The code elements are sensed through the electrodes 200 as corresponding contact resistance values. The electrodes 200 are pulled up to a potential Vcc by corresponding resistors and sensed via corresponding buffers 203 of a TTL. When the electrodes contact the corresponding code elements, the electrodes contacting the insulating coating 202 are held high in potential, so that the inputs to the TTLs become high while the elctrodes 200 contacting the conductive members 201 are grounded, namely, held low in potential and thus low potentials are input to the corresponding TTLs.

A pattern of such high and low electrode potentials is decoded by the control unit.

Figure 17:
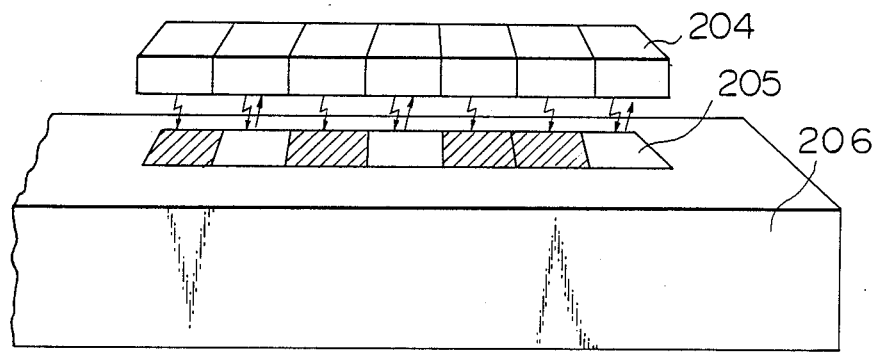
FIG. 17 is another embodiment of the sensor which senses the kind of a photosensitive film cartridge.

FIG. 17 shows a mechanism in which readers 204 read a code 205 made of a black-and-white pattern in which the sensitivity and number of photosensitive sheets are expressed in codes on the film cartridge 206. Each reader element 204 includes a reflective sensor, for example, of an infrared light emitting diode and a photodiode. The use of infrared rays eliminates the possibility of the film from being exposed to light.

FIG. 18 shows a mechanism in which a photointerrupter 208 senses a plurality of successive protrusions which represents the sensitivity and number of sheets provided on the surface of the cartridge 207.

FIG. 19 shows a mechanism which scans and extracts film information by the movement of a film cartridge 210 inserted into the device. The film cartridge is inserted through an opening in the device body. When a film data code 211 attached at a predetermined position on the cartridge 210 moves before a reflective sensor 209, it is read by the sensor.

Similarly, a protrusion may be provided at a predetermined position on a cartridge 210 and coded by a photointerrupter 221 with a mechanical sensor 220, as shown in FIG. 20.

While the above descrition refers to the photosensitive film cartridge 63, it may also be applicable to the pod receptacle and the transfer sheet 71 and further to an integral structure of the cartridge 63 and pod receptacle. For example, a code indicative of the kind of the transfer sheet, similar to that mentioned above, may be attached to the leading end of the transfer sheet 71 superposed on the pod. The sensor reads the code when the transfer sheet is set.

The above codes and signs may be used to calculate a film developing time which varies depending on the kind of the film as shown FIG. 15b. The films of the same kind may vary in sensitivity due to the manufacturing lots. The different sensitivities may be encoded beforehand and used for changing the target luminance value of the fluorescent lamp on the basis of the film sensitivity read in copying.

Figure 23:
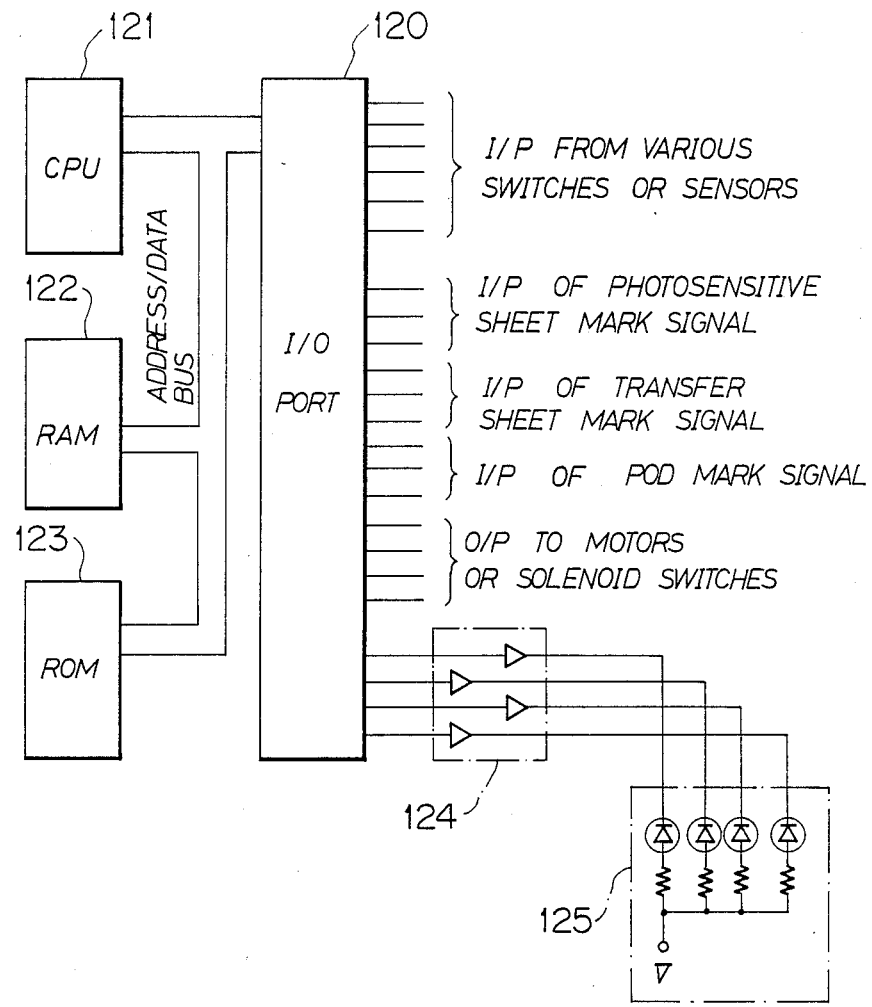
FIG. 23 is a schematic diagram of an embodiment of the inhibition means.

FIG. 23 represents a block diagram of the inhibition means according to the present invention. In FIG. 23, I/O port 120 receives a photosensitive sheet mark (code) signal, a transfer sheet mark (code) signal, a pod mark (code) signal and informations from various switches and sensors. I/O port 120 is connected with CPU 121, RAM 122 and ROM 123 through an address-/data bus. And further I/O port 120 outputs a processed signal to motors or solenoid switches for the reproducing operation mounted in the image reproducing device.

A photosensitive sheet mark (code), a transfer sheet mark (code) and a pod mark (code) each are read and transformed to an electric signal by a photoreflector which comprises a photodiode and a LED.

I/O port 120 is constituted by INTEL 8255. CPU 121 reads informations of above mentioned mark (code) signals through the ports of I/O port 120. CPU 121 compares at least two of the photosensitive sheet mark (code) signal, the transfer sheet mark (code) signal and the pod mark (code) signal. On judging of the coincidense of the mark (code) signals, CPU 121 refers to the informations written in RAM 122, ROM 123.

If all of the photosensitive sheet mark (code) signal, the transfer sheet mark (code) signal and the pod mark (code) signal coincide with each other, CPU 121 enables through I/O port 120 the reproducing operation of the motors and solenoid switches and lights on the copy enable LED of the operation display 125 through I/O port 120 and a transistor array 124 (Refer to FIG. 15a).

On the other hand, if at least two of the photosensitive sheet mark (code) signal, the transfer sheet mark (code) and the pod mark (code) signal don't coincide with each other, CPU 121 inhibits through I/O port 120 the reproducing operation of the motors and solenoid switches and lights on the copy disenable LED of the operation display 125 through I/O port 120 and a transistor array 124 (refer to FIG. 15a).

Figure 21:
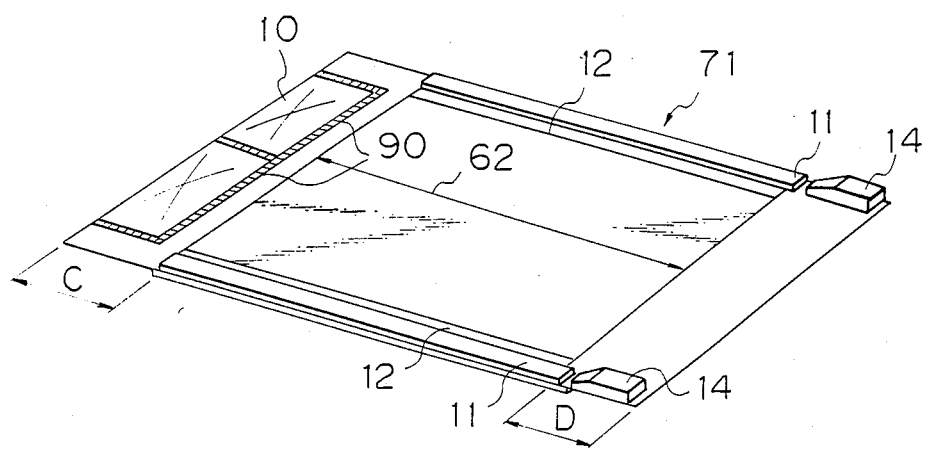
FIG. 21 is a perspective view of a transfer sheet with a pod mounted at an end of the transfer sheet.
Figure 22:
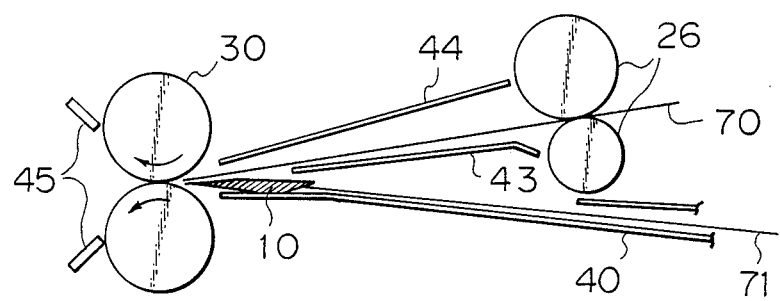
FIG. 22 is a side view of a portion of the FIG. 10 device in which the photosensitive film and the transfer sheet of FIG. 21 merge.

In this particular embodiment, a transfer sheet 71 with a pod 10 adhering to the leading end thereof my be used (FIG. 21). In that case, the arrangement of the developing pair of rollers 30 and its neighborhood in the particular embodiment is shown in FIG. 22. As shown in FIG. 21, the pod 10 is adhered to the leading end of the transfer sheet 71, so that a receptacle for the pod 10 is not needed, and the guide plate 44 extends close to the pair of rollers 30. A component of the embodiment of FIGS. 20 and 21 which is the same as that of the embodiment shown in FIGS. 3 and 4 is given the same reference numeral and further description thereof will be omitted.

Since the pod 10 and transfer sheet 71 are adhered integrally, the use of an undesirable combination of pod and transfer sheet can be prevented beforehand.

Many widely different embodiments of the present invention may be constructed without departing from the spirit and scope of the present invention. It should be understood that the present invention is not limited to the specific embodiments described in this specification, except as defined in the apended claims.

What is claimed is:

1. A control device for an image reproducing device wherein said reproducing device includes a photosensitive film cartridge, a transfer sheet cassette and a developer pod receptacle, each mounted separately, and where a peel-apart type film is used, said control device comprising:
    a first sensor for sensing a first code indicative of the type of the photosensitive film and applied to the photosensitive film or the photosensitive film cartridge;
    a second sensor for sensing a second code indicative of the kind of the transfer sheet and applied to the transfer sheet or the transfer sheet cassette;
    a third sensor for sensing a third code indicative of the kind of the pod and applied to the pod or the pod receptable; and
    means for inhibiting the operation of the device when at least two of the sensed first, second and third codes do not agree with each other.

2. A control device according to claim 1, wherein the first sensor is selected from the group consisting of a photoreflector type sensor, a photointerrupter type sensor, a contact resistance type sensor and a mechanical sensor.

3. A control device according to claim 1, wherein the second sensor is selected from the group consisting of a photoreflector type sensor, a photointerrupter type sensor, a contact resistance type sensor and a mechanical sensor.

4. A control device according to claim 1, wherein the third sensor is selected from the group consisting of a photoreflector type sensor, a photointerrupter type sensor, a contact resistance type sensor and a mechanical sensor.

5. A control device for an image reproducing device wherein said reproducing device includes a photosensitive film cartridge and a transfer sheet cassette, each mounted separately and where a peel-apart type film is used, said control device comprising:
    a first sensor for sensing a first code indicative of the type of the photosensitive film and applied to the photosensitive film or the photosensitive film cartridge;
    a second sensor for sensing a second code indicative of the king of the transfer sheet and applied to the transfer sheet or the transfer sheet cassette; and
    means for inhibiting the operation of the device when the sensed first and second codes do not agree with each other.

6. A control device according to claim 5, wherein the first sensor is selected from the group consisting of a photoreflector type sensor, a photointerrupter type sensor, a contact resistance type sensor and mechanical sensor.

7. A control device according to claim 5, wherein the second sensor is selected from the group consisting of a photoreflector type sensor, a photointerrupter type sensor, a contact resistance type sensor and mechanical sensor.

8. A control device for an image reproducing device wherein said reproducing device includes an integral type container in which a photosensitive film and a developer pod of the same kind are contained, a transfer sheet cassette mounted separately from the container, and a peel-apart type film is used, said control device comprising:
    a first sensor for sensing a first code indicative of the type of the photosensitive film and pod applied to the integral container;
    a second sensor for sensing a second code indicative of the kind of the transfer sheet and applied to the transfer sheet or the transfer sheet cassette; and
    means for inhibiting the operation of the device when the sensed first and second codes do not agree with each other.

9. A control device according to claim 8, wherein the first sensor is selected from the group consisting of a photoreflector type sensor, a photointerrupter type sensor, a contact resistance type sensor and a mechanical sensor.

10. A control device according to claim 8, wherein the second sensor is selected from the group consisting of a photoreflector type sensor, a photointerrupter type sensor, a contact resistance type sensor and a mechanical sensor.

11. A control device for an image reproducing device wherein said reproducing device includes a photosensitive film cartridge mounted therein, a transfer sheet with a developer pod adhered to the leading end thereof and of the same kind as the pod, which is fed manually, and where a peel-apart type film is used, said control device comprising:
    a first sensor for sensing a first code indicative of the type of the photosensitive film and applied to the photosensitive film or the photosensitive film cartridge;

a second sensor for sensing a second code indicative of the kind of the transfer sheet and pod and applied to the transfer sheet; and means for inhibiting the operation of the device when the sensed first and second codes do not agree with each other.

12. A control device according to claim 11, wherein the first sensor is selected from the group consisting of a photoreflector type sensor, a photointerrupter type sensor, a contact resistance type sensor and a mechanical sensor.

13. A control device according to claim 11, wherein the second sensor is selected from the group consisting of a photoreflector type sensor, a photointerrupter type sensor, a contact resistance type sensor and a mechanical sensor.

14. An image reproducing device comprising:

an optical unit for producing an image of an original document;

a photosensitive film cartridge ontaining photosensitive film;

means for moving said photosensitive film so as to be exposed to the image created by said optical unit;

a transfer sheet cassette containing transfer sheets;

means for moving said transfer sheets to a position adjacent that of the photosensitive film;

a developer pod receptacle containing a plurality of developer pods;

means for moving one of the said pods between said photosensitive film and said transfer sheet;

roller means for breaking open said pod and spreading developer contained therein between said transfer sheet and said photosensitive film so as to cause the image to be transferred and developed on said transfer sheet;

a first sensor for sensing a first code indicative of the type of the photosensitive film and applied to the photosensitive film or the photosensitive film cartridge;

a second sensor for sensing a second code indicative of the kind of the transfer sheet and applied to the transfer sheet or the transfer sheet cassette;

a third sensor for sensing a third code indicative of the kind of the pod and applied to the pod or the pod receptacle; and means for inhibiting the operation of the image reproducing device when at least two of the sensed first, second and third codes do not agree with each other.

15. An image reproducing device comprising:

an optical unit for reproducing an image of an original document;

a photosensitive film cartridge containing photosensitive film;

means for moving said photosensitive film so as to be exposed to the image created by said optical unit;

a transfer sheet cassette containing transfer sheets;

means for moving said transfer sheets to a position adjacent that of the photosensitive film;

roller means for breaking open said pod and spreading developer contained therein between said transfer sheet and said photosensitive film so as to cause the image to be transferred and developed on said transfer sheet;

a first sensor for sensing a first code indicative of the type of the photosensitive film and applied to the photosensitive film or the photosensitive film cartridge;

a second sensor for sensing a second code indicative of the kind of the transfer sheet and applied to the transfer sheet or the transfer sheet cassette; and means for inhibiting the operation of the image reproducing device when the sensed first and second codes do not agree with each other.

16. An image reproducing device comprising:

an optical unit for producing an image of an original document;

an integral type container containing photosensitive film and developer pods;

means for moving said photosensitive film so as to be exposed to the image created by said optical unit;

a transfer sheet cassette containing transfer sheets;

means for moving said transfer sheets to a position adjacent that of the photosensitive film;

means for moving one of said pods between said photosensitive film and said transfer sheet;

roller means for breaking open said pod and spreading developer contained therein between said transfer sheet and said photosensitive film so as to cause the image to be transferred and developed on said transfer sheet;

a first sensor for sensing a first code indicative of the type of the photosensitive film and pod and applied to the integral container;

a second sensor for sensing a second code indicative of the kind of the transfer sheet and applied to the transfer sheet or the transfer sheet cassette; and means for inhibiting the operation of the image reproducing device when the sensed first and second codes do not agree with each other.

17. An image reproducing device comprising:

an optical unit for producing an image of an original document;

a photosensitive film cartridge containing photosensitive film;

means for moving said photosensitive film so as to be exposed to the image created by said optical unit;

a plurality of transfer sheets, each having a developer pod adhered to the leading end thereof, said transfer sheets beings manually fed;

roller means for breaking open said pod and spreading developer contained therein between said transfer sheet and said photosensitive film so as to cause the image to be transferred and developed on said transfer sheet;

a first sensor for sensing a first code indicative of the type of the photosensitive film and applied to the photosensitive film or the photosensitive film cartridge;

a second sensor for sensing a second code indicative of the kind of the transfer sheet and pod and applied to the transfer sheet; and means for inhibiting the operation of the image reproducing device when the sensed first and second codes do not agree with each other.

18. A method for operating an image reproducing device which contains a photosensitive film cartridge, a transfer sheet cassette and a developer pod receptacle which are mounted separately, comprising the steps of:

providing a first code indicative of the type of the photosensitive film which is applied to the photosensitive film or the photosensitive film cartridge;

providing a second code indicative of the kind of transfer sheet which is applied to the transfer sheet or the transfer sheet cassette;

providing a third code indicative of the kind of the pod which is applied to the pod or the receptacle;

sensing said first code, said second code and said third code; and inhibiting the operation of the reproducing device when at least two of the sensed codes do not agree with each other.

19. A method for operating an image reproducing device which contains a photosensitive film cartridge and a transfer sheet cassette, which are mounted separately, comprising the steps of:

providing a first code indicative of the type of the photosensitive film which is applied to the photosensitive film or the photosensitive film cartridge;

providing a second code indicative of the kind of transfer sheet which is applied to the transfer sheet or the transfer sheet cassette;

sensing said first code and said second code; and inhibiting the operation of the reproducing device when the sensed first and second codes do not agree with each other.

20. A method for operating an image reproducing device which contains an integral type container having a photosensitive film and a developer pod and a transfer sheet cassette which are mounted separately, comprising the steps of:

providing a first code indicative of the type of photosensitive film and pod which is applied to the integral container;

providing a second code indicative of the kind of transfer sheet which is applied to the transfer sheet or the transfer sheet cassette;

sensing said first code and second code; and inhibiting the operation of the reproducing device when the sensed first and second codes do not agree with each other.

21. A method for operating an image reproducing device which contains a photosensitive film cartridge and manually fed transfer sheets with developer pods attached to the leading end thereof, comprising the steps of:

providing a first code indicative of the type of the photosensitive film which is applied to the photosensitive film or the photosensitive film cartridge;

providing a second code indicative of the kind of transfer sheet and pod which is applied to the transfer sheet;

sensing said first code and said second code; and inhibiting the operation of the reproducing device when the sensed first and second codes do not agree with each other.

22. An image reproducing method comprising the steps of:

producing an image of an original document;

moving a photosensitive film from a photosensitive film cartridge so that it is exposed by said image;

moving a transfer sheet from a transfer sheet cassette to a position adjacent that of the photosensitive film;

moving a developer pod from a developer pod receptacle to a position between said photosensitive film and said transfer sheet;

rolling said photosensitive film, transfer sheet and developer pod by a pair of rollers so as to cause the developer from the pod to be spread evenly between the transfer sheet and the photosensitive film to cause an image to be transferred and developed on said transfer sheet;

providing a first code indicative of the type of photosensitive film which is applied to the photosensitive film or the photosensitive film cartridge;

providing a second code indicative of the kind of transfer sheet which is applied to the transfer sheet or the transfer sheet cassette;

providing a third code indicative of the kind of pod which is applied to the pod or the pod receptacle;

sensing said first code, said second code and said third code; and inhibiting the operation of the reproducing device when at least two of the sensed codes do not agree with each other.

23. An image reproducing method comprising the steps of:

producing an image of an original document;

moving a photosensitive film from a photosensitive film cartridge so that it is exposed by said image;

moving a transfer sheet from a transfer sheet cassette to a position adjacent that of the photosensitive film;

providing a first code indicative of the type of photosensitive film which is applied to the photosensitive film or the photosensitive film cartridge;

providing a second code indicative of the kind of transfer sheet which is applied to the transfer sheet or the transfer sheet cassette;

sensing said first code and said second code; and inhibiting the operation of the reproducing device when the sensed first and second codes do not agree with each other.

24. An image reproducing method comprising the steps of:

producing an image of an original document;

moving a photosensitive film from an integral type container which also contains developer pods so that it is exposed by said image;

moving a transfer sheet from a transfer sheet cassette to a position adjacent that of the photosensitive film;

moving a developer pod from said integral type container to a position between said photosensitive film and said transfer sheet;

rolling said photosensitive film, transfer sheet and developer pod by a pair of rollers so as to cause the developer from the pod to be spread evenly between the transfer sheet and the photosensitive film to cause an image to be transferred and developed on said transfer sheet;

providing a first code indicative of the type of photosensitive film and pod which is applied to the integral container;

providing a second code indicative of the kind of transfer sheet which is applied to the transfer sheet or the transfer sheet cassette;

sensing said first code and said second code; and inhibiting the operation of the reproducing device when the sensed first and second codes do not agree with each other.

25. An image reproducing method comprising the steps of:

producing an image of an original document;

moving a photosensitive film from a photosensitive film cartridge so that it is exposed by said image;

manually feeding transfer sheets having developer pods adhered to the leading end thereof;

rolling said photosensitive film, transfer sheet and developer pod by a pair of rollers so as to cause the developer from the pod to be spread evenly between the transfer sheet and the photosensitive film to cause an image to be transferred and developed on said transfer sheet;

providing a first code indicative of the type of photosensitive film which is applied to the photosensitive film or the photosensitive film cartridge;

providing a second code indicative of the kind of transfer sheet and pod which is applied to the transfer sheet;

sensing said first code and said second code; and inhibiting the operation of the reproducing device when the sensed first and second codes do not agree with each other.

* * * * *